Patented July 30, 1929.

1,722,480

UNITED STATES PATENT OFFICE.

CARL PONTOPPIDAN, OF HOLTE, COPENHAGEN, DENMARK, ASSIGNOR TO F. L. SMIDTH & CO., OF NEW YORK, N. Y., A CORPORATION OF NEW JERSEY.

HYDRAULIC CEMENT.

No Drawing.   Application filed June 30, 1927. Serial No. 202,759.

The object of this invention is to produce an hydraulic cement which shall have about the same time of setting as normal Portland cement but shall harden more rapidly when the hardening commences. Long continued effort on the part of the present applicant to produce this result, while avoiding unsoundness in the cement, due to the presence of any element, particularly calcium oxide, in a free or not perfectly combined condition, has shown that the result can be attained, as will be particularly described hereinafter, by careful determination of the hydraulic modulus, that is, the ratio between the basic and the acid substances, and of the silica modulus, that is, the ratio of the silica to the aluminum oxide and the ferric oxide, and the reduction of the materials to such a fineness, not characteristic of normal Portland cement, that complete combination of all of the elements is effected. It may be necessary also to take into consideration the aluminum-iron modulus, that is, the ratio between the aluminum oxide and the ferric oxide.

Comparison of the improved cement with natural cement and alumina cement is unnecessary because the improved cement, as well as normal Portland cement, is high in content of calcium oxide, while natural cement and alumina cement alike are low in content of calcium oxide. Because, however, of the greater resemblance between the improved cement and normal Portland cement in the matter of the content of calcium oxide, a more careful comparison of the improved cement with normal Portland cement is desirable. To make such a comparison it is necessary to discuss briefly some of the known characteristics of hydraulic cements.

It is well known that the chief basic element in such cements is calcium oxide and that the chief acid elements are the silica and the aluminum oxide, iron oxide being also generally counted as an acid element. The basic element is in excess, so that the hydrauic cements have a basic reaction and might be called basic salts. When the cement materials are burned to sintering, their ability to harden or their hydraulic properties are largely dependent on the degree of excess of the base. The more base (calcium oxide), the quicker they react with water and harden, because of the great affinity of calcium oxide for water. On the other hand, with more of the acid element, the more effectively will the base be held in combination and the more slowly will the cement be attacked by water and hardened. It will be understood, therefore, that the ratio between the basic and acid elements, called the hydraulic modulus, is of chief importance in determining how quickly the cement hardens with water, the higher the ratio, the quicker the hardening.

However, the hydraulic modulus alone is not a sufficient index of the hardening ability of the cement. It is also necessary to take into consideration the relations of the acid elements, such as the silicate, the aluminum oxide and the ferric oxide, there being a considerable difference in the ability of these elements to hold or bind the base (calcium oxide), that is, to effect the complete combination with the base, with no free element. A given percentage of silica can bind or hold more calcium oxide than an equal percentage of aluminum oxide. For a fixed total of these acid elements, the ability to hold or bind the base depends therefore on the proportion between the silica and the aluminum oxide. For general purposes the ferric oxide may be regarded as an equivalent, in this respect, of a like percentage of aluminum oxide. It is therefore usual to regard the ratio of the silica to the total of the aluminum oxide and the ferric oxide as the silica modulus or silica ratio. The higher this modulus or ratio, the more effectively the base is held in combination.

Of two cements with the same hydraulic modulus, that with the highest silica modulus will be the slower in hardening, other things being equal. The hydraulic modulus must therefore be considered in relation to the silica modulus, a high silica modulus requiring a high hydraulic modulus in order that the cement may have a normal degree of basicity.

It is preferably to keep the percentage of ferric oxide rather low because its increase tends to retard the hardening as well as to retard the setting. On the other hand, the alkalis tend to accelerate the setting of the cement and may be used as found desirable.

It is known that there is a considerable variation in the silica modulus of various brands of Portland cement, as well as in the hydraulic modulus, the former running from about 1.45 to about 3.42, and the latter from about 1.82 to about 2.26, the average hydraulic modulus being well below 2.15, with a corresponding silica modulus, which varies from 1.8 to 2.7.

In the development of the present invention, it has been found that one desirable characteristic of the improved cement is that the hydraulic modulus shall be about 2.20 or over, while the silica modulus is below 3.0. In a typical example, the hydraulic modulus is 2.40 and the silica modulus is 2.37. The high hydraulic modulus coupled with a normal silica modulus gives the cement a high degree of basicity and makes it consequently a very rapidly hardening cement. As compared with a normal Portland cement, with a modulus of about 2.0, it will be seen that there is a very considerable difference in an improved cement with a hydraulic modulus of 2.40. It would be impossible to manufacture an improved cement having this characteristic by the usual practice in the manufacture of normal Portland cement, for the reason that if so manufactured, the cement would be exceedingly unsound, because complete combination of the calcium oxide with the acid elements would not be effected, with the result that a part of the lime would be present as free calcium oxide and concrete made out of such cement would expand and crack when subjected to the action of water. Portland cement must be completely sound to meet the standard specifications and can therefore contain at the most only a fraction of 1% of free calcium oxide. Hence, in the manufacture of normal Portland cement, the hydraulic modulus must be kept down to about 2.0, whereas in the improved cement, the hydraulic modulus should be over 2.20.

The problem of increasing the hydraulic modulus without causing unsoundness in the cement is solved by increasing the fineness of the material. In normal Portland cement practice, the mixture of limestone and clay or shale, in the proportions of about three to one, is ground to such a fineness that from 80–90% will pass a 200 mesh screen and is then burned to sintering. The sintered product is then ground to about the same degree of fineness, with the addition of so much calcium sulphate that the sulphuric acid anhydride does not exceed 2% in the finished cement. In the production of the improved cement, the cement materials, either separately or in mixture, as the nature of the materials may require, are ground to such a degree of fineness that for an hydraulic modulus of 2.40, from 98–99% will pass a 200 mesh screen. By this second characteristic of the improved cement, the particles of limestone and clay are brought into more intimate contact and the complete combination of the two elements during the burning is made possible. The increase of the fineness from 80–90%, commonly used for normal Portland cement, to 98–99%, for the improved cement, requires an increase of from 60% to 85% in grinding power. To grind a substance means to increase the total surface of its particles and the great increase in grinding power required for the production of the improved cement is a fair index of the increase in contact surface of the particles necessary for the production of a sound cement with an hydraulic modulus of 2.40.

It may be noted that a cement with an hydraulic modulus of about 2.40, for example, requires a burning temperature higher than that used in the manufacture of normal Portland cement, running above the maximum of 2700° Fahrenheit, commonly used in the manufacture of normal Portland cement.

The grinding of the cement materials to a fineness of 98–99% passing a 200 mesh screen, as previously stated, before the burning is essential to the production of the improved cement. The resultant clinker can be ground to any desired fineness, but it is desirable to grind the clinker to a high degree of fineness in order to produce a rapid hardening cement. It is possible to grind it to a fineness of 99% or more without getting a too quick setting. If normal Portland cement clinker should be ground to a fineness greater than 80–90%, the cement would be too quick setting. It would be altogether impossible to control the setting time of normal Portland cements ground to a fineness of 99%, but with the improved cement, this is possible, probably because of the high hydraulic modulus, which seems to have the property of preventing too quick setting, while it accelerates the hardening when the setting of the cement has once begun.

In the manufacture of normal Portland cement, gypsum (calcium sulphate), for the purpose of regulating the setting time of the cement, is added in such an amount that the content of sulphuric acid anhydride does not exceed the 2% permitted by standard specifications. Although the addition of a greater amount would be otherwise desirable, because its combination during the hydration would promote the early strength or quick hardening considerably, a larger amount is not permitted under standard specifications, because any excess of uncombined gypsum in the cement might be the cause of expansion and cracks in the concrete. In the improved cement, a complete combination of a large amount of gypsum is possible. In normal Portland cement from 40–50% of the cement never hydrates at all because of its lack of affinity for water, but the improved cement hydrates completely and for this reason it is possible to combine, in the improved cement, a much larger amount of gypsum than can be combined in normal Portland cement. The addition of more gypsum is found to increase considerably the early strength or quick hardening of the improved cement. It has been found possible to add gypsum to about 6%.

In some cases in which it is difficult to control the setting time, as in the case of cement with a low silica modulus, it is possible to add a small amount of calcium chloride, say from ½ of 1% to 2%, either before or after the grinding, to prevent too quick setting when the gypsum is insufficient.

The hydraulic modulus and silica modulus for the new hydraulic cement given above apply to the cement when nothing else is added except water and calcined or raw pure gypsum. If it is desired to mix with this cement other substances such as impure gypsum, silica in one form or another, Puzzolano, Trass, blastfurnace slag or other slag, limestone, clay, lime, minerals etc. the fact that the analysis of such mixtures gives an hydraulic modulus and a silica modulus outside the limits specified above does not except such mixtures from the scope of the invention set forth in the claims.

It will be understood that in the foregoing explanation of this invention both the hydraulic modulus and the silica modulus are calculated upon gravimetric weights. It will also be understood that in the calculation of the hydraulic modulus the percentage of calcium oxide is divided by the sum of the silica, alumina and iron oxide percentages and no other, and that in the calculation of the silica modulus the percentage of silica is divided by the sum of the alumina and iron oxide percentages and no other.

I claim as my invention:

1. An improved rapid hardening cement formed of a mixture of raw cement materials and having an hydraulic modulus of not less than 2.20 and a silica modulus of less than 3.00, ground to a fineness exceeding 95% passing a 200-mesh screen, burned to sintering and ground.

2. An improved rapid hardening cement formed of a mixture of raw cement materials, both ground to a fineness exceeding 95% passing a 200-mesh screen and having an hydraulic modulus of not less than 2.20 and a silica modulus of less than 3.00, burned to sintering and ground after burning to a fineness exceeding 95% passing a 200-mesh screen.

3. An improved rapid hardening cement formed of a mixture of raw cement materials and having an hydraulic modulus of not less than 2.20 and a silica modulus of less than 3.00, ground to a fineness exceeding 95% passing a 200-mesh screen, and burned to sintering, the finished cement having a content of sulphuric acid anhydride exceeding 2%.

4. The process of producing a rapid hardening cement from raw cement materials which consists in mixing the raw materials in such proportions as to secure in the finished cement an hydraulic modulus of not less than 2.20 and a silica modulus of less than 3.00, grinding the mixture to a fineness exceeding 95% passing a 200-mesh screen, burning the mixture to sintering, and grinding the resultant clinker.

5. The process of producing a rapid hardening cement from raw cement materials which consists in mixing the raw materials in such proportions as to secure in the finished cement an hydraulic modulus of not less than 2.20 and a silica modulus of less than 3.00, grinding the mixture to a fineness exceeding 95% passing a 200-mesh screen, burning the mixture to sintering, and grinding the resultant clinker to a fineness exceeding 95% passing a 200-mesh screen.

6. The process of producing a rapid hardening cement from raw cement materials which consists in mixing the raw materials in such proportions as to secure in the finished cement an hydraulic modulus of not less than 2.20 and a silica modulus of less than 3.00, grinding the mixture to a fineness exceeding 95% passing a 200-mesh screen, burning the mixture to sintering, grinding the resultant clinker to a fineness exceeding 95% passing a 200-mesh screen, and adding to the ground clinker so much calcium sulphate that the content of sulphuric acid anhydride exceeds 2% in the finished cement.

This specification signed this 17th day of June, A. D. 1927.

CARL PONTOPPIDAN.